OR 3,664,721 x 3054W

May 23, 1972 — H. N. ROBERTS — 3,664,721

DATA STORAGE AND RETRIEVAL METHOD AND APPARATUS

Filed Sept. 9, 1970 — 2 Sheets-Sheet 1

INVENTOR
HOWARD N. ROBERTS
BY Yount and Tarolli
ATTORNEYS

DATA STORAGE AND RETRIEVAL METHOD AND APPARATUS

Filed Sept. 9, 1970 2 Sheets-Sheet 2

INVENTOR
HOWARD N. ROBERTS

BY Young and Tarolli
ATTORNEYS

United States Patent Office 3,664,721
Patented May 23, 1972

3,664,721
DATA STORAGE AND RETRIEVAL METHOD AND APPARATUS
Howard N. Roberts, Ann Arbor, Mich., assignor to Radiation Incorporated, Palm Bay, Fla.
Filed Sept. 9, 1970, Ser. No. 70,855
Int. Cl. G02b *27/00*
U.S. Cl. 350—3.5 6 Claims

ABSTRACT OF THE DISCLOSURE

Holographic data storage and retrieval system in which holograms of data are made by deflecting a reference beam to different positions on a recording medium to sequentially interfere with object beams for different data with the objects of the object beams being imaged by a lens at an output plane beyond the recording medium. The area of the recording medium exposed to the object and reference beams is controlled to limit the area on the recording medium exposed to the object beam for each hologram in each array. A recording reference beam is of the same size as the limited area of recording. The recording is made in the Fourier or near Fourier transform plane. On readout, the beam which is used as a reference beam on recording is used as the readout beam and is deflected to select the data to be read out. A real image of the data is formed at the output plane on the side of the hologram received from the light source.

The present invention relates to holographic data storage and retrieval systems and particularly to a system in which a Fourier or a near Fourier transform hologram is employed.

In a data storage and retrieval system, retrieval of data often requires a real image of high resolution and quality that can be accurately registered on a detector or display. Heretofore, the production of such real images has required the use of a readout beam upon reconstruction which is conjugate to the recording reference beam or a rotation of the hologram, if the desired real image is to be obtained without the use of lenses in the reconstructed beam. The use of a conjugate readout beam introduces problems in a system where the hologram is one which was recorded with different reference beam angles and makes it difficult to use a beam which is angularly deflected for readout purposes. The rotation of the hologram or the use of a lens in the reconstructed beam makes it difficult to secure good registration of data images on reconstruction. Registration and high resolution is particularly important in a data storage and retrieval system where high density storage is involved.

An important object of the present invention is to eliminate or minimize the foregoing problems in a data storage and retrieval system using holograms, particularly a system adapted for use as a relatively high density binary storage system, and to provide a system in which the reference beam optics can be used upon reconstruction as the readout optics.

It is also an object of the present invention to provide a new and improved data storage and retrieval system in which the information is stored in the form of a near Fourier transform hologram and in which problems of registration and aberration are minimized on readout.

Another object of the present invention is to provide a new and improved holographic data storage and retrieval system in which the Fourier transform or near Fourier transform of data is stored holographically and in which a real image is formed on reconstruction at an output plane on the side of the hologram plane remote from the object plane by illuminating the hologram with a beam which is the same as the reference beam used on recording, the hologram being maintained in the same position relative to the readout beam as it was when the recording occurred.

A further object of the present invention is to provide a new and improved data storage and retrieval system in which various data are holographically recorded at different locations on the hologram by deflecting the reference beam sequentially to different locations at the hologram recording medium.

Yet another aspect of the present invention is to provide a new and improved data storage and retrieval system in which data may be reconstructed from a hologram memory by deflecting a beam to different areas of the hologram array which have different data stored therein with the readout optics being the same as the reference beam optics used to record the hologram and producing a real image without the use of lenses in the reconstructed beam.

Yet another object of the present invention is to provide a new and improved holographic system in which a near Fourier transform hologram is formed by imaging the object beam at a plane beyond the hologram recording plane and recording the hologram at or near the Fourier transform of the object.

Further objects and advantages of the present invention will be apparent from the following description thereof made with reference to the accompanying drawings in which.

Figure 1:
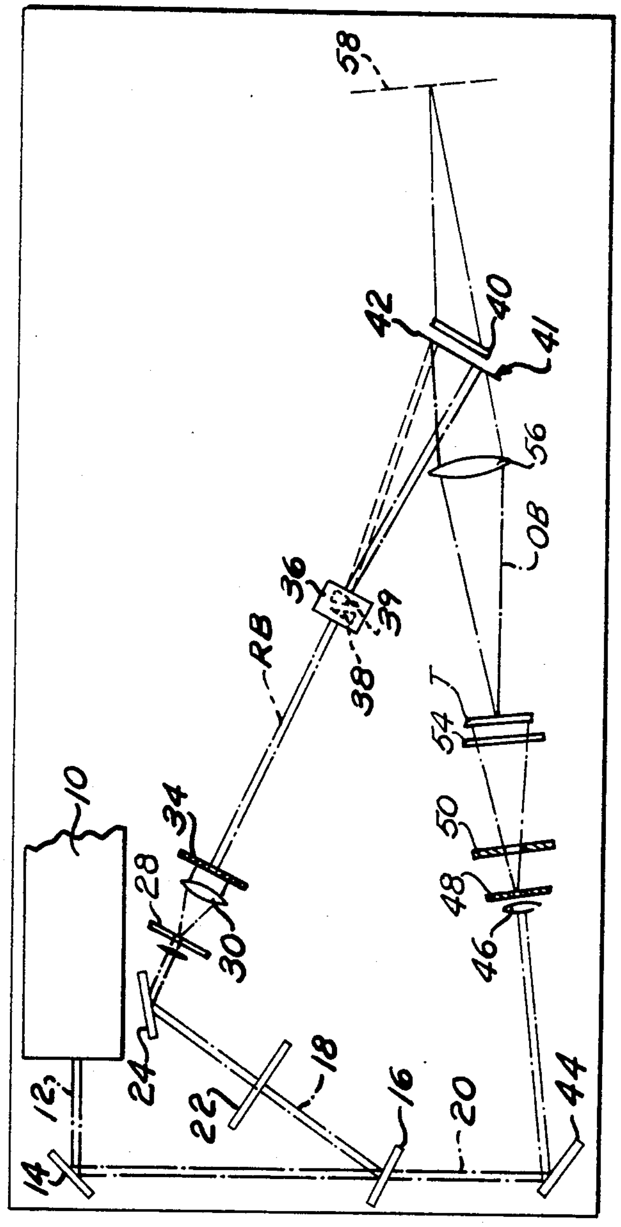
FIG. 1 is a diagrammatic representation of a holographic system embodying the present invention.

The specific embodiment of the preferred form of the invention illustrated in the drawings includes a laser 10 which provides a beam 12 of coherent radiation. The laser may be a conventional helium neon laser which has a light wave length of 632.8 nm. The coherent light beam from the laser is reflected by a mirror 14 to a beam splitter 16.

The beam splitter splits the beam 12 from the laser into two beams, a beam 18 for providing the reference beam and a beam 20 to be used for illuminating the object. The beam 18 for forming the reference beam may be directed through a neutral density filter 22, if it is desired to regulate the ratio of the intensity of the beam 18 to the object illuminating beam, to the mirror 24.

The beam 18 is reflected from the mirror 24 through a convex lens and a pinhole in a pinhole plate 28 and through a collimating lens 30. The pinhole resembles a point source and is positioned in the front focal plane of the convex lens 30 so that the beam from the pinhole is collimated by the lens 30. A portion of the collimated beam is selected by an aperture plate 34 and the selected portion becomes the reference beam RB. The reference beam RB passes through a rotatable prism beam deflector 36 which utilizes two independently rotatable prisms 38 and 39 to direct the beam to a selected portion of a hologram recording medium in the form of a light sensitive plate 40. As the rotatable prism beam deflector is selectively rotated to one position or another, the reference beam RB is deflected so that it strikes different portions of the hologram plate 40. Rotating prism beam deflectors are known to those skilled in the art and it is appreciated by them that such a deflector has the prisms or glass wedges 38 and 39 disposed to rotate about the axis of the incoming beam and the prisms have a position in which the deflection of the prisms counteract each other so that the beam will not be angularly deflected by the deflector. It will become apparent that by selectively positioning appropriately chosen prisms about their axes, any location on the hologram recording medium can be selected.

The holographic medium of the plate 40 may be any conventional holographic recording medium including a material which does not require processing between the recording and readout steps such as a photochromic material.

The beam 20 from the beam splitter 16 is reflected from a mirror 44 through a convex lens 46. The lens 46 is placed in front of the pinhole in a pinhole plate 48 which serves as a point source of coherent radiation for an object, a transparency T in the illustrated embodiment, which contains information to be recorded. The light from the point source passes through an aperture plate 50 which selects the desired beam width for the beam for illuminating the object. A diffusing pate 54 may be placed in front of the transparency T to diffuse the beam from the aperture 50.

The present invention is particularly useful in data storage and retrieval systems where the transparency contains digital information in the form of binary bits which are to be stored and subsequently reconstructed and detected.

The beam from the transparency, which contains the information to be recorded, passes through a convex lens 56 which images the transparency at an image plane 58 which is located behind the hologram plate 40 and which coincides with the output plane for the readout of information from the apparatus. The beam bearing the object data may be referred to as object beam OB.

The hologram plate 40 is preferably supported at or near the plane where the Fourier spectrum of the diffusely illuminated transparency T is formed. The hologram plate 40 is positioned at any convenient angle to the reference beam.

The object beam OB is intercepted by the hologram plate 40 and since the beam is of a size to spread over an area corresponding to the entire recording surface of the hologram plate 40, a sub-area of the hologram plate on which the recording is to occur is determined by limiting the area exposed by using aperture means 41. The aperture means 41 comprises an aperture plate 42 which has a single aperture therein. The plate 42 and the aperture therein limit the exposure of the hologram plate to a sub-area opposite to the aperture even through the object beam is of a size to illuminate the entire recording area of the recording medium.

It will be noted that when a Fourier transform hologram of a diffusely illuminated object is made, the hologram will contain information from all points of the transparency. This is to be distinguished from image plane holography where the selection of a part of the beam at the recording medium, by using an aperture as described, would result in information from only one portion of the transparency being recorded. While the hologram may be made in a plane removed from the Fourier transform plane and still maintain this characteristic, the closer to the image plane that the recording is made, the larger the recording area required to obtain equivalent quality reconstructions.

Figure 2:
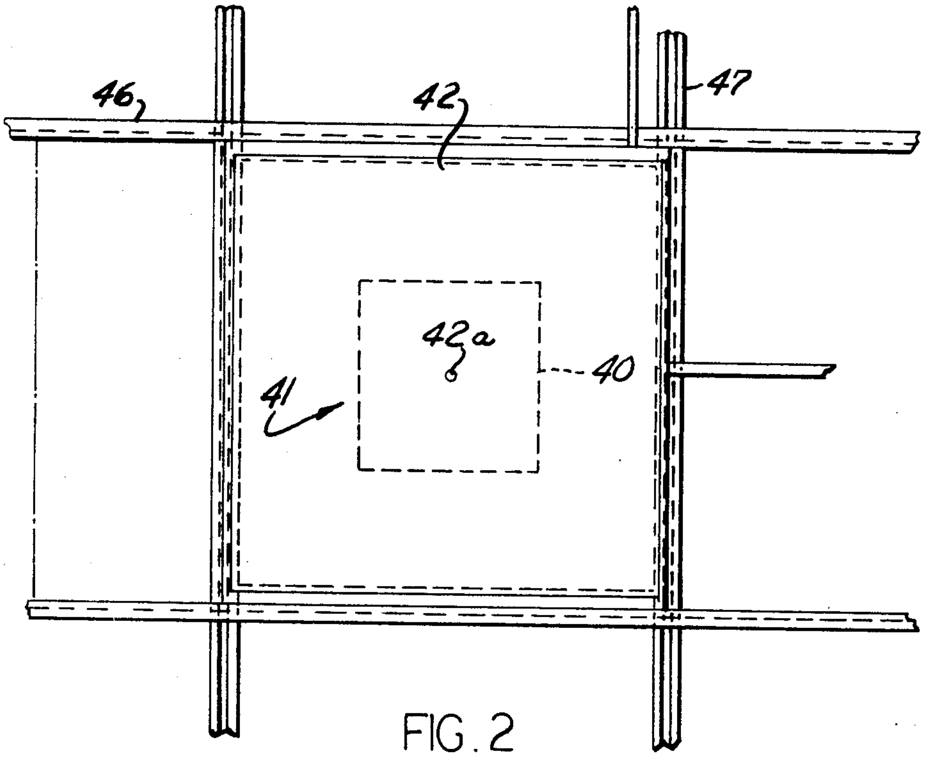
FIG. 2 is a diagram showing an aperture plate and its movable support structure.

FIG. 2 illustrates an enlarged view of aperture means 41 which may be utilized to select the sub-area of the hologram plate 40 on which a recording is to be made. The aperture means 41 includes the plate 42 with the aperture **42*a* therein. The plate 42 is mounted in a frame having opposite sides received in guide channels 46 to support the plate for movement along one coordinate axis of the recording plane while the channels 46 are supported on guides 47 extending perpendicular to the guides 46 to support the plate or shutter member 42 for movement along a perpendicularly related coordinate axis. Accordingly, the shutter member can be shifted to position the aperture 42*a*** at any selected recording location. The shutter member may be shifted by any suitable mechanism such as X, Y positioning servos having motors for moving the member in the X and Y directions respectively and it will be appreciated by those skilled in the art that the X, Y positioning servos may be operated from commands which are applied simultaneously with commands to the rotatable beam deflector to synchronize the beam deflection and the selection of the recording location.

The holograms of different data are recorded sequentially by selecting a particular sub-area or region for recording and by positioning the aperture **42*a* opposite to the area and operating the beam deflector to direct the reference beam RB toward the recording material through the aperture simultaneously with the object beam. The reference beam is of approximately the same size as the aperture 42*a***.

When holograms of the information arrays have been made by inserting transparencies with different data thereon at the object plane and selecting different areas of the hologram for recording the data, the recording medium is developed and replaced in the apparatus in the same position as it occupied during recording. If the material is a photochromic or other similar material which does not require a developing process, there is no need to remove it for development. When the halogram is returned to the position which it occupied on recording, the reference beam may be operated to illuminate selected areas of the hologram to provide a reconstructed beam which forms a real image at the output plane 58. On readout, the aperture plate is preferably removed so that it is ineffective to block light from the hologram and the information to be reconstructed is selected by deflecting the beam which was the reference beam during recording but which is now being used as a readout beam. Since the readout beam is limited in size to the size of a sub-area on which information is recorded, only information for a given element in the array will be reconstructed at one time. The sub-areas have the same size so that the size of the beam need not be changed. It can be seen that by accessing a hologram by deflecting the beam, the stored information may be rapidly reconstructed.

The output plane may contain a screen or other device for visually displaying the real image, if desired, or the image after being formed may be projected to another location by a conventional optical system. In a system for storing and retrieving digital data, a matrix of photosensitive elements may be positioned in the output plane to detect whether stored binary bits have a 1 or 0 value. It can be seen that to obtain accurate reading of digital information, particularly when it is stored with high density, it is important to have accurate registration of images. The present system is capable of providing the necessary registration without the need for difficult alignment in conjugate optical systems.

Figure 3:
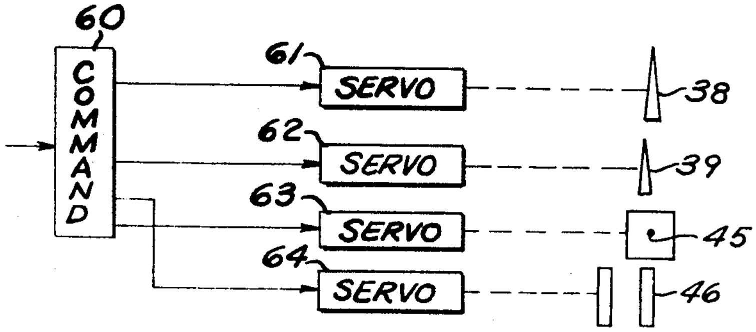
FIGS. 3 and 4 are diagrammatic showings of a servo system which may be used with the system of FIG. 1 to position the aperture plate of FIG. 2.

FIG. 3 is a schematic illustration of a servo system for automatically controlling beam deflection and the shutter means on recording and beam deflection on readout.

A command register 60 receives digital commands in the form of desired position numbers for servo mechanisms 61, 62 for driving the prisms 38, 39, respectively, and servo mechanisms 63, 64 for moving the plate member 42 on the channels 46 and the channels 46 on the guides 47, respectively.

Figure 4:
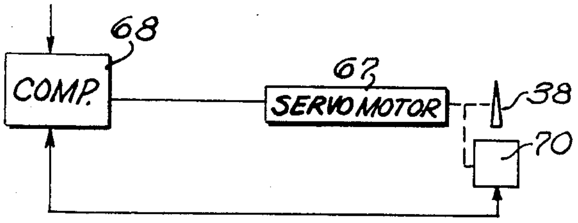

Each of the servo mechanisms may be the same as the servo mechanism 61 which is illustrated in FIG. 4. The servo mechanism 61 may include a servo motor 67 for driving the prism 38 and a comparator 68 for comparing the digital position number from the command register 60 with the actual position of the prism 38 as determined by a digital encoder 70 driven by the servo motor in synchronism with the prism 38. The comparator provides an error signal to the servo motor which indicates the direction and magnitude of the error in position to drive the motor to effect correspondence between the desired position and the actual position of the prism 38. It will be understood that before readout commences, one of the servo mechanisms 63, 64 will be operated to completely remove the plate member 42 from in front of the recorded hologram and only the beam deflection servos 61, 62 will be operated to deflect the beam to select the hologram which is to be read out.

From the foregoing it can be seen that a new and improved simple data storage and retrieval system has been provided. In the system the same reference beam optics are used for readout as for recording. By imaging the object beam during recording beyond the plane of the hologram, a real image can be obtained in an output plane by use of the same beam as is used as the reference beam on recording. Therefore, the beam addressing circuits and the beam selection circuits are all the same and since the hologram can be in precisely the same position as it was on recording and since the same beam optics can be used, there is no problem in obtaining registration of the images at the output plane, although the system maintains the advantages of a simple holographic system with respect to aberrations and distortions.

The system eliminates the need for a separate lens to image the reconstructed beam. The elimination of the lens for imaging the reconstructed beam is accomplished by placing the object in the recording system so that the object data is imaged at the output plane which is beyond the hologram plane and which may coincide with a detector plane.

While rotating beam prisms are used to deflect the reference beam, it will be understood that other suitable beam deflection means may be utilized, for example, electro-optical means or acousto-optical means may be substituted.

In the described embodiment, a diffuser has been utilized to illuminate the object and provide information about all points of the object at all positions on the recording medium so that holograms may be constructed in sub-areas of the hologram plane. In another embodiment the diffuser may be removed from the system and means provided to deflect the Fourier transform or near Fourier transform for different objects to selected sub-areas at the hologram plane in synchronism with the deflection of the reference beam. If different diffraction gratings with different spatial frequencies are used for the respective objects, the Fourier transform of the objects will occur at different positions on the recording medium and the grating array may be utilized to effect the recordings at various selected locations on the hologram. Alternately, a prism deflector system, such as that described for the reference beam, may be used to deflect the signal beam in synchronism with the reference beam.

Having described my invention, I claim:

1. A method for holographic data storage and retrieval, which comprises imaging on a predetermined image plane a coherent object beam containing information to be recorded, such that a Fourier transform of the information is formed at a plane between a source of said information and said image plane, disposing a holographic recording medium in the path of said object beam ahead of the image plane, substantially at the Fourier transform plane, intersecting a limited portion of the object beam with a mutually coherent reference beam to form a hologram of the information in a limited region of said recording medium, the size of said reference beam being controlled so as to conform to said limited region of said recording medium, selectively deflecting only the reference beam to intersect a limited portion of successive object beams containing other information to be recorded, each object beam being imaged on said image plane, to form distinct and different holograms in other limited regions of said recording medium, and with said recording medium in the same position and orientation in the optical system as said medium had during recording, retrieving information from any desired one of said holograms by deflecting a readout beam, conforming in position and direction to said reference beam and derived from identically the same optical system as was said reference beam, to impinge on the desired hologram, whereby a real image of information from any desired hologram is formed at said image plane.

2. The method according to claim 1 wherein said imaging is performed by passing the object beam through a lens between the source of the information impressed upon the object beam and the holographic recording medium.

3. The method according to claim 2 wherein said source is a transparency.

4. The method according to claim 1 wherein said limited portion of each object beam is defined by selectively masking the remaining portion of the respective object beam.

5. The method according to claim 1 wherein said selective deflecting is accomplished by appropriate rotation of a rotatable prism beam deflector in the path of said reference beam.

6. The method according to claim 1 wherein said holographic recording medium is a self-developing medium.

References Cited

UNITED STATES PATENTS

| | | | |
|---|---|---|---|
| 3,530,442 | 9/1970 | Collier et al. | 350—3.5 |
| 3,535,012 | 10/1970 | Rosen | 350—3.5 |
| 3,511,554 | 5/1970 | Osterberg et al. | 350—3.5 |
| 3,488,106 | 1/1970 | Lohmann | 350—162 SF |

OTHER REFERENCES

Vitols, IBM Technical Disclosure Bulletin, vol. 8, No. 11, April 1966, pp. 1581–1583.

DAVID SCHONBERG, Primary Examiner

R. J. STERN, Assistant Examiner

U.S. Cl. X.R.

340—173 LT